(12) United States Patent
Guittet et al.

(10) Patent No.: US 8,229,674 B2
(45) Date of Patent: Jul. 24, 2012

(54) AUTOMATED HISTOLOGICAL GRADING OF TUBULES

(75) Inventors: Christelle Marie Guittet, Malvern (GB); Margaret Jai Varga, Malvern (GB); Paul Gerard Ducksbury, Malvern (GB)

(73) Assignee: Qinetiq Limited (GB)

( * ) Notice: Subject to any disclaimer, the term of this patent is extended or adjusted under 35 U.S.C. 154(b) by 1269 days.

(21) Appl. No.: 10/529,509

(22) PCT Filed: Oct. 20, 2003

(86) PCT No.: PCT/GB03/04527
§ 371 (c)(1),
(2), (4) Date: Mar. 28, 2005

(87) PCT Pub. No.: WO2004/038633
PCT Pub. Date: May 6, 2004

(65) Prior Publication Data
US 2006/0036369 A1 Feb. 16, 2006

(51) Int. Cl.
*G01N 33/50* (2006.01)
(52) U.S. Cl. ........................................................ 702/19
(58) Field of Classification Search .................. None
See application file for complete search history.

(56) References Cited

U.S. PATENT DOCUMENTS

| 5,257,182 A | 10/1993 | Luck et al. |
| 5,939,278 A * | 8/1999 | Boon et al. ................ 435/7.23 |
| 6,031,930 A | 2/2000 | Bacus et al. |

OTHER PUBLICATIONS

Cheng, "A Parallel Approach to Tubule Grading in Breast Cancer Lesions and Its VLSI Implementation", Proceedings of the 4th Annual IEEE Symposium, pp. 322-329 (1991).

* cited by examiner

*Primary Examiner* — Jason Sims
(74) *Attorney, Agent, or Firm* — McDonnell Boehnen Hulbert & Berghoff LLP

(57) ABSTRACT

A method of grading tubules in a first histological slide image derives a second image of objects in the first image of objects in the first image with boundary characteristics corresponding to tubules. It also derives a third image of second objects in the first image having pixel value characteristic of fat and holes within tubules. It combines data from the second and third images to identify holes within tubules and determines the relative areas of holes as proportions of their tubules to provide ratios, individual tubule ratios and an overall ration for all holes and tubules collectively. The number of tubules containing appreciably sized holes is counted. Tubules are graded by thresholding based on individual and overall tubule/hole area ratios, tubule/object proportion, tubule number and number of tubule with appreciably sized holes. Thresholds are derived from image gradation by an appropriate medical expert.

15 Claims, 4 Drawing Sheets

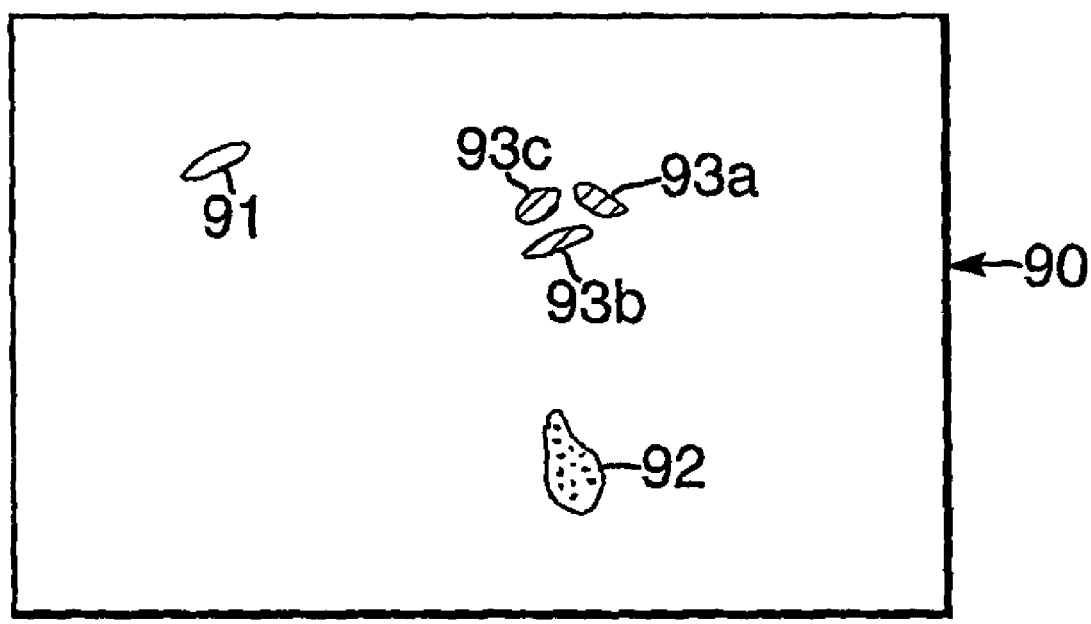

AUTOMATED HISTOLOGICAL GRADING OF TUBULES

This invention relates to a method, an apparatus and a computer program for grading tubules: it is particularly (although not exclusively) relevant to assessment of histological slides to provide clinical information on potentially cancerous tissue such as breast cancer tissue.

Breast cancer is a common form of female cancer: Once a lesion indicative of breast cancer has been detected, tissue samples are taken and examined by a histopathologist to establish a diagnosis, prognosis and treatment plan. However, pathological analysis of tissue samples is a time consuming and inaccurate process. It entails interpretation of images by human eye, which is highly subjective: it is characterised by considerable inaccuracies in observations of the same samples by different observers and even by the same observer at different times. For example, two different observers assessing the same ten tissue samples may easily give different opinions for three of the slides—30% error. The problem is exacerbated by heterogeneity, i.e. complexity of some tissue sample features.

There is a need to provide an objective measurement of tubules grading to support a pathologist's diagnosis and patients' treatment.

The present invention provides a method of grading tubules in a first image of a histological slide characterised in that it has the steps of:
a) providing a second image of first objects in the first image which are sufficiently large and of appropriate pixel value characteristics at boundaries to potentially be tubules,
b) providing a third image of second objects in the first image having pixel value characteristics of holes within tubules and fat,
c) combining data from the second and third images to identify selected second objects which are within first objects,
d) performing one or more of the following:
  i) counting first objects in the first image which may potentially be tubules to provide a parameter NOB,
  ii) counting the first objects having selected second objects within them and likely to be tubules to provide a parameter N,
  iii) determining the relative areas of selected second objects as proportions of respective first objects within which they are located to provide parameters RATIO,
  iv) determining the total area of selected second objects as a proportion of total area of first objects within which they are located to provide a parameter SURF,
  v) determining a parameter PERCENT=N/NOB, and
  vi) counting the number of first objects containing at least medium sized holes to provide a parameter T, and
e) grading the first image's tubules on the basis of the one or more parameters as aforesaid with reference to parameter threshold values.

The invention provides the advantage that it is an objective method of grading tubules in a histological slide.

The step of providing a second image may incorporate:
a) thresholding the first image to provide a fourth image retaining relatively darker image pixels and rejecting relatively lighter image pixels,
b) processing the fourth image by applying the following steps in succession, the first being applied to the fourth image and each after the first being applied to the outcome of the respective immediately preceding step: inversion, morphological dilation, median filtering, hole filling and morphological opening.

The step of providing a third image may comprise thresholding the first image to provide a binary fourth image in which relatively lighter image pixels have a different binary value to that of relatively darker image pixels. The step of combining data from the second and third images comprises multiplying pixels in the second image by or ANDing them with respective corresponding pixels located in like positions the third image. The step of grading the first image's tubules employs parameter threshold values set to obtain a grading comparable with that obtainable by an appropriate medical expert.

In a preferred embodiment, the present invention provides a method of grading tubules in a first image of a histological slide characterised in that it has the steps of:
a) providing a second image of first objects in the first image which are sufficiently large and of appropriate pixel value characteristics at boundaries to potentially be tubules and counting them to provide a parameter NOB,
b) providing a third image of second objects in the first image having pixel value characteristics of fat and holes within tubules,
c) combining data from the second and third images to identify selected second objects which are within first objects,
d) counting the first objects having selected second objects within them and likely to be tubules to provide a parameter N,
e) determining the relative areas of selected second objects as proportions of respective first objects within which they are located to provide parameters RATIO,
f) determining the total area of selected second objects as a proportion of total area of first objects within which they are located to provide a parameter SURF,
g) determining a parameter PERCENT=N/NOB,
h) counting the number of first objects containing at least medium sized holes to provide a parameter T, and
i) grading the first image's tubules on the basis of the first image's parameters as aforesaid with reference to parameter threshold values.

In this embodiment, the invention provides the advantage that it is an objective method which grades tubules from a variety of parameters yielding multiple grading from which a median can be derived.

In another aspect, the present invention provides computer apparatus for grading tubules in a first image of a histological slide characterised in that it is programmed to:
a) compute a second image of first objects in the first image which are sufficiently large and of appropriate pixel value characteristics at boundaries to potentially be tubules,
b) compute a third image of second objects in the first image having pixel value characteristics of holes within tubules and fat,
c) combine data from the second and third images to identify selected second objects which are within first objects,
d) implement one or more of the following:
  i) counting first objects in the first image which may potentially be tubules to provide a parameter NOB,
  ii) counting the first objects having selected second objects within them and likely to be tubules to provide a parameter N, iii) determining the relative areas of selected second objects as proportions of respective first objects within which they are located to provide parameters RATIO,
iv) determining the total area of selected second objects as a proportion of total area of first objects within which they are located to provide a parameter SURF,
v) determining a parameter PERCENT=N/NOB, and
vi) counting the number of first objects containing at least medium sized holes to provide a parameter T, and e) grade the first image's tubules on the basis of the one or more parameters as aforesaid with reference to parameter threshold values.

In a preferred embodiment of this aspect, the present invention provides computer apparatus for grading tubules in a first image of a histological slide characterised in that it is programmed to:
a) provide a second image of first objects in the first image which are sufficiently large and of appropriate pixel value characteristics at boundaries to potentially be tubules and counting them to provide a parameter NOB,
b) provide a third image of second objects in the first image having pixel value characteristics of fat and holes within tubules,
c) combine data from the second and third images to identify selected second objects which are within first objects,
d) count the first objects having selected second objects within them and likely to be tubules to provide a parameter N,
e) determine the relative areas of selected second objects as proportions of respective first objects within which they are located to provide parameters RATIO,
f) determine the total area of selected second objects as a proportion of total area of first objects within which they are located to provide a parameter SURF,
g) determine a parameter PERCENT=N/NOB,
h) count the number of first objects containing at least medium sized holes to provide a parameter T, and
i) grade the first image's tubules on the basis of the first image's parameters as aforesaid with reference to parameter threshold values.

In a further aspect, the present invention provides a computer program for use in grading tubules in a first image of a histological slide characterised in that it contains instructions for controlling computer apparatus to:
a) compute a second image of first objects in the first image which are sufficiently large and of appropriate pixel value characteristics at boundaries to potentially be tubules,
b) compute a third image of second objects in the first image having pixel value characteristics of fat and holes within tubules,
c) combine data from the second and third images to identify selected second objects which are within first objects,
d) implement one or more of the following:
   i) counting first objects in the first image which may potentially be tubules to provide a parameter NOB,
   ii) counting the first objects having selected second objects within them and likely to be tubules to provide a parameter N,
   iii) determining the relative areas of selected second objects as proportions of respective first objects within which they are located to provide parameters RATIO,
   iv) determining the total area of selected second objects as a proportion of total area of first objects within which they are located to provide a parameter SURF,
   v) determining a parameter PERCENT=N/NOB, and
   vi) counting the number of first objects containing at least medium sized holes to provide a parameter T, and
e) grade the first image's tubules on the basis of the one or more parameters as aforesaid with reference to parameter threshold values.

In a preferred embodiment of this aspect, the present invention provides a computer program for grading tubules in a first image of a histological slide characterised in that it contains instructions for controlling computer apparatus to:
a) provide a second image of first objects in the first image which are sufficiently large and of appropriate pixel value characteristics at boundaries to potentially be tubules and counting them to provide a parameter NOB,
b) provide a third image of second objects in the first image having pixel value characteristics of fat and holes within tubules,
c) combine data from the second and third images to identify selected second objects which are within first objects,
d) count the first objects having selected second objects within them and likely to be tubules to provide a parameter N,
e) determine the relative areas of selected second objects as proportions of respective first objects within which they are located to provide parameters RATIO,
f) determine the total area of selected second objects as a proportion of total area of first objects within which they are located to provide a parameter SURF,
g) determine a parameter PERCENT=N/NOB,
h) count the number of first objects containing at least medium sized holes to provide a parameter T, and
i) grade the first image's tubules on the basis of the first image's parameters as aforesaid with reference to parameter threshold values.

The computer program and apparatus aspects of the invention may have preferred features corresponding to those of respective method aspects.

In order that the invention might be more fully understood, embodiments thereof will now be described, by way of example only, with reference to the accompanying drawings, in which:

FIGS. 3 to 7 are simplified versions of images obtained during the FIG. 2 procedure.

Figure 1:
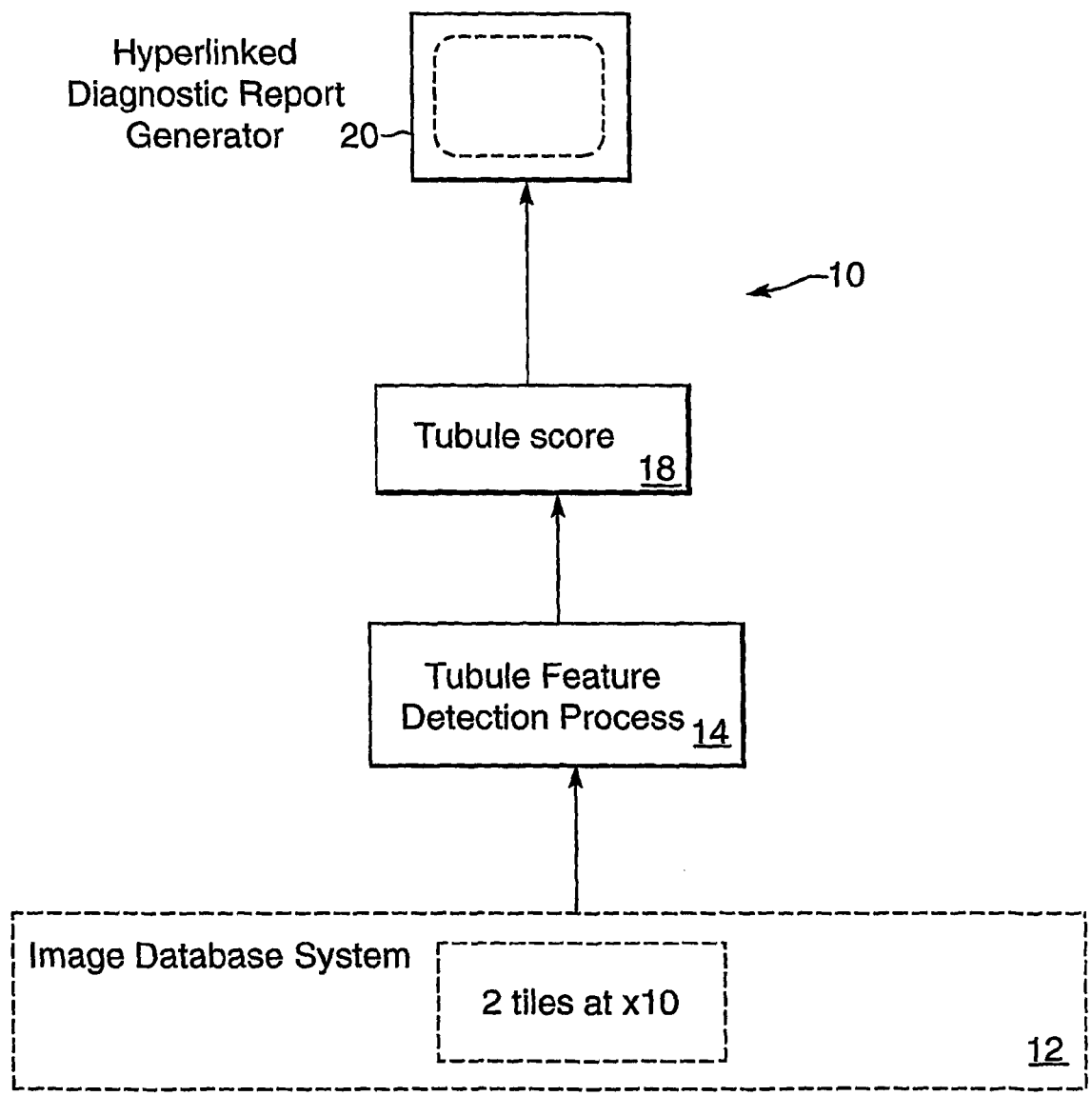
FIG. 1 is a block diagram of a procedure of the invention for measuring tubule activity.

Referring to FIG. 1, there is illustrated a procedure 10 of the invention for assessment of tubule activity in tissue samples presented as histopathological slides of potential carcinomas of the breast. The procedure 10 requires data from histological slides in a suitable form. Sections are taken (cut) from breast tissue samples (biopsies) and placed on respective slides. Slides are stained using the staining agent Haemotoxylin & Eosin (H&E), which is the standard stain for delineating tissue and cellular structure. Tissue specimens stained with H&E are used to assess tubule activity. In the present example, image data were obtained by a pathologist using Zeiss Axioskop microscope with a Jenoptiks Progres 3012 digital camera. Image data from a slide is a set of digital images obtained at a linear magnification of 10 (i.e. 10×).

To select images, a pathologist scans the microscope over a slide, and at 10× magnification selects two regions (referred to as tiles) of the slide which appear to be most promising in terms of an analysis to be performed. Both these regions are then photographed using the microscope and digital camera referred to above. The digital camera produces for each region a respective digitised image in three colours, i.e. red, green and blue (R, G & B) eight bit values for each pixel and therefore in the range 0 to 255: each image is an electronic equivalent of a tile. Three intensity values are obtained for each pixel in a pixel array to provide an image as a combination of R, G and B image planes. The image data from the two tiles are stored in a database 12 for later use. Tubule activity is determined using a tubule feature detection process 14: this provides a tubule score 18 for input to a diagnostic report at 20.

The objective of the procedure 10 is to perform an extraction and a count of the tubules present in an image. A tubule is an image of a section through a mammary duct produced in the slide production process: it can appear round, oval, cylindrical or irregular depending on the angle of the section to the duct axis and the shape of the duct after sectioning. It appears as a white area surrounded by a dark epithelial layer (or boundary). A tubule score is 1, 2 or 3 according to whether the condition is least, moderately or most serious respectively. Tubules may be less in number or absent in images scored 2 or 3 because cancerous cells are invading them. The procedure 10 seeks to identify those white areas in an image that are surrounded by a dark epithelial layer: This should exclude fat, which also appears white but tends not to be surrounded by a darker epithelial layer.

In a prior art manual procedure, a clinician places a slide under a microscope and examines a region of it at magnification of ×10 for indications of tubule activity. The prior art manual procedure for scoring tubule activity involves a pathologist subjectively estimating the amount of tubules present in a tissue sample, taking care to ignore those areas considered to be fat cells. The process described below in this example replaces the prior art manual procedure with an objective procedure.

Figure 2:
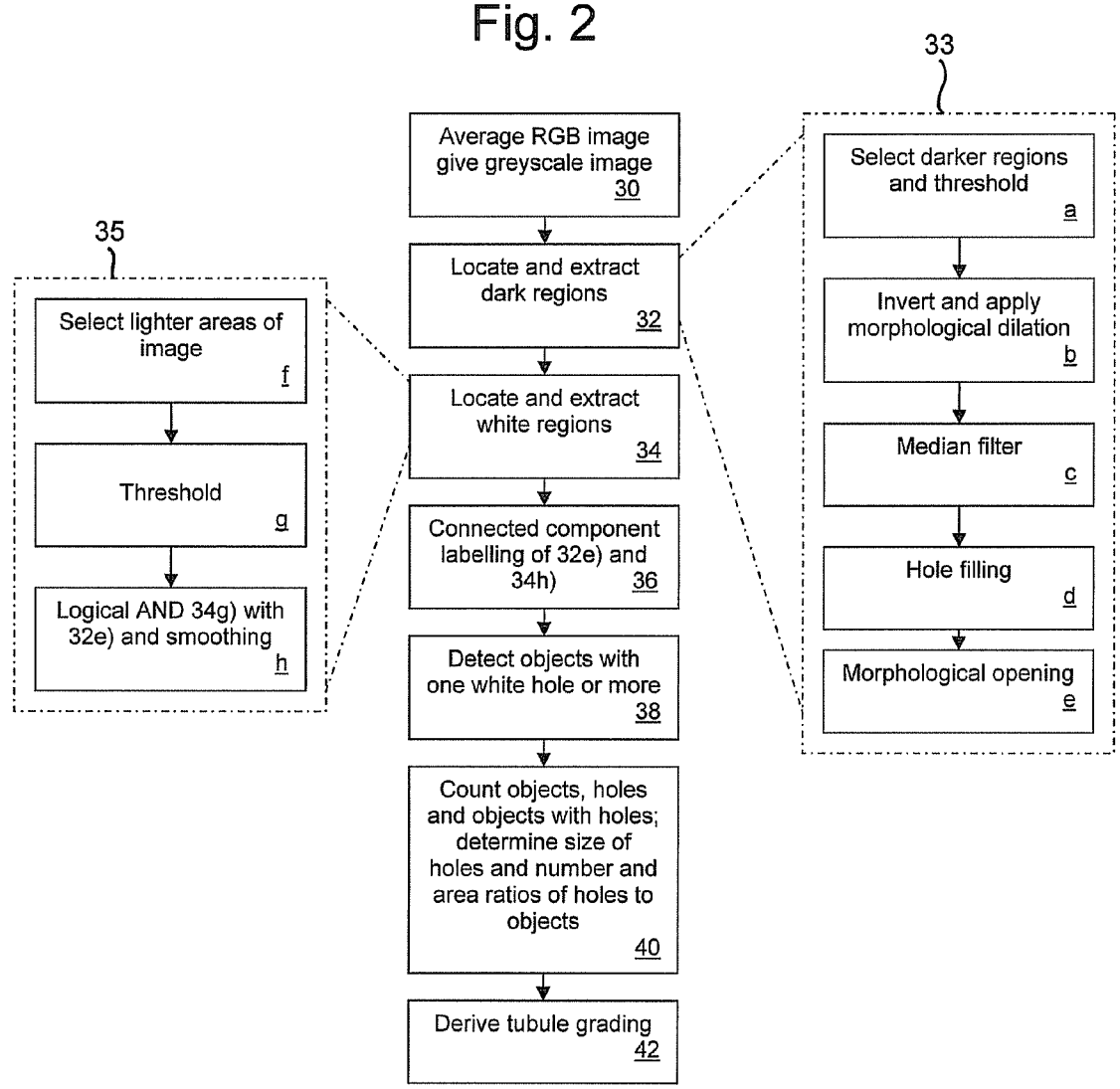
FIG. 2 is a block diagram showing part of the procedure of FIG. 1 in more detail.
Figure 3:
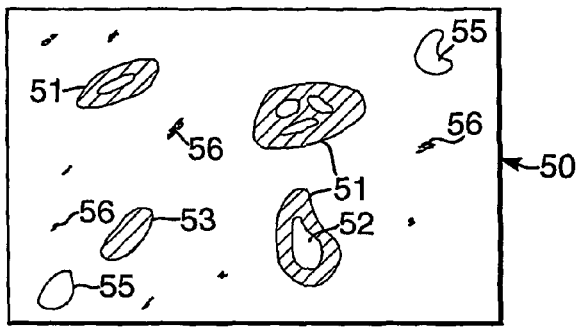

Referring now to FIG. 2, the process 14 is shown in more detail: it is carried out for each of the two digitised images mentioned above, but will be described for one. At 30 an input colour image is used to calculate a greyscale equivalent: i.e. for each pixel the respective red, green and blue pixel values are averaged to produce a single greyscale pixel value. This is repeated for all pixels in the image to provide for further processing a greyscale initial image 50 as shown in FIG. 3 in simplified form. FIG. 3 illustrates various kinds of initial image feature, tubules 51 with pronounced dark boundaries containing one or more holes such as 52, large dark objects 53, fat cells 55 with only very narrow faint boundaries and small dark objects 56 of no interest.

Step 32 is shown in more detail as a number of constituent steps a) to e) within chain lines 33. At a), the objective is to select from the greyscale image 50 only relatively darker pixels and omit relatively lighter pixels. An image is obtained from a) which contains relatively darker objects of varying size: the larger of these objects are likely to contain tubules, but others smaller in size are unlikely to do so. To implement step a), initially all pixels in the greyscale image 50 are compared with one another to obtain their maximum (Maxg) and minimum (Ming) values: these values are used to compute a parameter P given by:

$$P = 12(Maxg - Ming)/100 \quad (1)$$

Each pixel in the greyscale image 50 is then divided by 255 so that it lies in the range 0 to 1. The value P is then used to transform the greyscale image 50 into an output image as shown in Table 1 below:

TABLE 1

| Input image pixel value | Output image pixel value |
| --- | --- |
| <1/255 | 0 |
| ≧1/255 AND ≦(Maxg − P)/255 | Mapped to the range [0, 1] |
| >(Maxg − P)/255 | 1 |

This means 1/255 becomes 0, (Maxg−P)/255 becomes 1 and x≧1/255 AND ≦(Maxg−P)/255 becomes (x−1/255)/({Maxg−P}/255−1/255). The resulting output image values are now thresholded to produce a binary image: all output image pixel values less than a threshold value of 0.85 are set to zero, and all other pixel values are set to 1. The threshold of 0.85 was arrived at experimentally using trial images.

At b) the image output from step a) is inverted so that epithelial layers now appear white and background and holes appear black. A morphological dilation is applied to the inverted image which thickens and closes small gaps in the white epithelial layers but leaving background and tubule holes unaffected. The objective of b) is to close boundaries likely to contain tubules that might have been left open by step a). Morphological operations are often used to fuse narrow gaps and eliminate small holes in individual groups of contiguous pixels appearing as blobs in an image. They can be thought of as removal of irregularities or spatial "noise", and they are standard image processing procedures published in Umbaugh S. C., 'Colour vision and image processing', Prentice Hall, 1998. In this instance the morphological dilation is represented by a disc-shaped structuring element with 5 rows and 5 columns and corresponding (by convention) to a radius R of two pixels:

$$\text{Structuring element} = \begin{matrix} 0 & 0 & 1 & 0 & 0 \\ 0 & 1 & 1 & 1 & 0 \\ 1 & 1 & 1 & 1 & 1 \\ 0 & 1 & 1 & 1 & 0 \\ 0 & 0 & 1 & 0 & 0 \end{matrix} \updownarrow R \quad (2)$$

here the expression "disc-shaped" arises from the distribution of 1s in the element which appear as a rudimentary disc.

Morphological dilation is an expansion operation: for an original binary image (i.e. having pixel values 1 and 0 only), the expansion operation comprises locating each pixel with value 1 and setting pixels nearby to it also to 1. The structuring element defined by Equation (2) above illustrates this: the central 1 indicates a pixel under consideration and 1s above, below, on either side of it and diagonally near to it indicate pixels in the binary image set to 1; 0s in the structuring element indicate relative positions of pixels that remain unchanged.

At c) a median filter is applied to the output of step b): the median filter operation selects each pixel in the output of step b) in succession and takes a 3×3 array of those pixels centred on the selected pixel; the 3×3 array of pixels is then sorted into ascending order of pixel value, i.e. 0s followed by 1s. The median pixel value (fifth of nine) is then taken as the filter output to replace the value of the selected pixel. The filter output will be 0 or 1 according to whether or not the 3×3 array has more 0s than 1s. This is repeated across the image. Pixels in or separated by one pixel from edge rows and columns do not have the requisite 3×3 array, and for these the original pixel values are retained in the median filtered image. Median filtering is desirable to remove small isolated groups of pixels generated during thresholding at a). Step c) is desirable (but not essential)—it has the effect of smoothing blobs in the median filtered binary image produced at b).

The output image from step c) contains image regions or blobs which are white outlines around tubule structures, and the next process at d) is to fill these blobs to make them solid for further processing—the objective is to fill in holes which ideally lie within tubules. To achieve this, all pixels contained within each boundary of white pixels are set to the same value as the boundary. Here a hole is a set of background pixels that cannot be reached by filling in the background from the edge of the image: the technique of hole-filling is based on morphological reconstruction as published in Piere Soille, 'Morphological image analysis: Principals and Applications', Springer-Verlag, 1999, pp 173-174. At e), a binary image resulting from d) is then subjected to morphological opening using the 9×9 disc shaped structuring element, defined below in Equation (3).

$$\text{Structuring element} = \begin{matrix} 0 & 0 & 1 & 1 & 1 & 1 & 1 & 0 & 0 \\ 0 & 1 & 1 & 1 & 1 & 1 & 1 & 1 & 0 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 1 & 1 & 1 & 1 & 1 & 1 & 1 & 1 & 1 \\ 0 & 1 & 1 & 1 & 1 & 1 & 1 & 1 & 0 \\ 0 & 0 & 1 & 1 & 1 & 1 & 1 & 0 & 0 \end{matrix} \quad (3)$$

Step e) removes small groups of dark pixels such as 56 that are not part of larger objects or boundaries around tubules.

Figure 4:
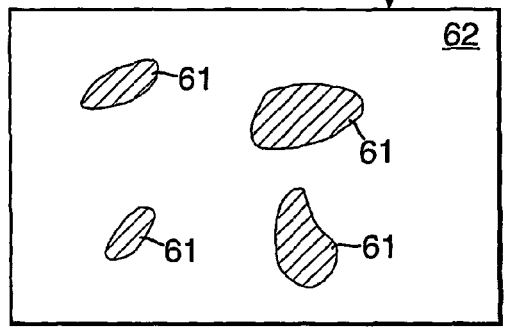

Steps a) to e) identify blobs in the greyscale image 50 (corresponding either to dark areas with holes inside or to wholly dark objects) that are more likely to be the boundaries of tubules. In FIG. 4, a binary image 60 is shown which is the output of step e): identified blobs are now represented as closed blobs 61 (i.e. containing no holes) of varying sizes of pixel value 1 in a background 62 of 0s.

Step 34 is a procedure undertaken to extract white regions of the initial greyscale image 50, these regions appearing as relatively high value pixel groups. This step is shown in more detail at f), g) and h) within chain lines 35. At f), each pixel value in the initial image 50 is divided by 255 so that it lies in the range 0 to 1, and then the pixel values x in the resulting image (input image in the table below) are remapped to an output image for the selection of light regions in accordance with the following table:

| Input image value | Output image value |
| --- | --- |
| <(maximum − Q)/255 | 0 |
| ≧(maximum − Q)/255 AND ≦1.0 | Mapped to the range [0, 1] |

Where Q = 40(Maxg − Ming)/100
In the above table, the expression "Mapped to the range [0, 1]" means that: a pixel value x which is BOTH ≧(maximum − Q)/255 AND ≦1.0 becomes: (x − (maximum − Q)/255)/(1 − (maximum − Q)/255)).

Figure 5:
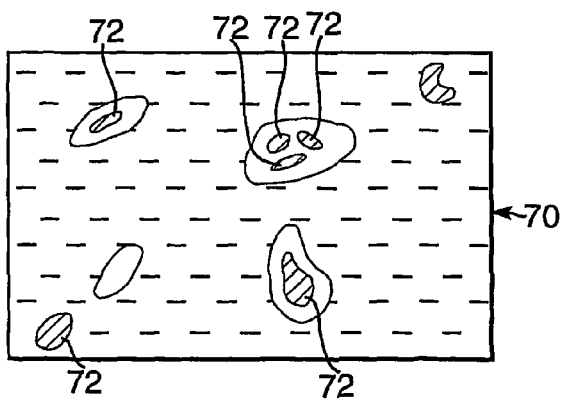

The resulting output image values are thresholded at g) to produce a binary image: all output image pixel values less than a threshold value of 0.35 are set to zero, and all other pixel values are set to 1. The threshold of 0.35 was arrived at experimentally using trial images. An image 70 resulting from g) is shown in FIG. 5: it is equivalent to the image 50 with "white island" areas 72 shown cross-hatched.

Referring to FIG. 4 once more, the image 60 resulting from step e) contains black objects 61 among which there are dark tubule boundaries with respective filled (darkened) inner regions (originally white), all marked as a single object of pixel 1 values and in a background of 0s. The image 70 resulting from step g) contains regions 72 of pixel value 1 which corresponding to lighter regions 52/55 of the greyscales image 50. The image 70 also contains 0s in positions corresponding to darker regions 51/53 of the image 50. At h), a logical AND operation is now carried out between each pixel in the image 60 with the respective corresponding pixel in the same position in the other image 70. The AND operation is equivalent in this instance to multiplication because a one-bit AND operation gives the product of two input bits. The output of the AND operation is 1 in each case where both ANDed pixels are 1, and is 0 otherwise. Also at h), the result of the AND operation is smoothed.

Figure 6:
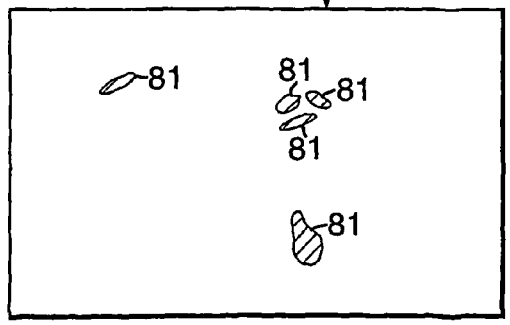

FIG. 6 shows a binary image 80 resulting from the AND operation between the images 60 and 70 and subsequent smoothing at h). The image 80 has is only at locations 81 (shown cross-hatched) corresponding (see image 50) to central holes such as 52 in potential tubules 51. This has the effect of removing objects which correspond in the original greyscales image 50 to isolated white islands (usually fat cells) which are not surrounded by a dark boundary.

At 36 a respective connected component labelling (CCL) operation is applied to each of the images 60 and 80 resulting from e) and h): CCL is a known image processing technique (sometimes referred to as 'blob colouring') published by Klette R., Zamperoniu P., 'Handbook of Image Processing Operators', John Wiley & Sons, 1996, and Rosenfeld A., Kak A. C., 'Digital Picture Processing', vols. 1 & 2, Academic Press, New York, 1982. It gives different numerical labels to objects (blobs) in a binary image containing 0s and 1s only, objects being groups of contiguous or connected pixels of 1: each object is assigned a number (label) different to others to enable it to be distinguished. CCL labels objects with numbers beginning with 1, so the numbers of the highest numbered objects in the images 60 and 80 are respectively the number of objects which might potentially be tubules and the number of holes previously within dark areas.

A tubule may contain one or more holes, and this is required to be detected to avoid an incorrect tubule count. At 38, each pixel in the h) image 80 is multiplied by the corresponding pixel in the same location in the CCL of image 60, which is a colour image when displayed on a colour monitor because CCL gives different colours to different objects. FIG. 7 shows an image 90 resulting from multiplication at 38: the image 90 does not have an image feature corresponding to the lower left hand blob in FIG. 4, because it has been eliminated by multiplication by 0s in corresponding locations in the image 80. The image 90 retains features 91, 92 and 93a to 93c corresponding to tubule holes such as 52 in the initial image 50. In this example images were processed using computer software referred to as "Matlab®" produced by Mathworks Inc., an American corporation. A Matlab function "ismember" is used to identify holes 91 and 92 associated with respective single tubules that have different labels, and holes 93a to 93c all associated with the same tubule that have the same label albeit different to those of holes 91 and 92. Differences in labelling and colouring is indicated in FIG. 7 by differing shading, i.e. hole 91 is unshaded, hole 92 is dotted and like-labelled holes 93a to 93c are all cross-hatched. The number of different shadings in FIG. 7 reflects the number of tubules corrected for multiple holes in any tubule.

The areas of the objects and holes labelled are also obtained using a Matlab function "find" in order to compute the number of pixels per coloured object or hole. This gives the total object area in each case for the four objects 61 in FIG. 4 (of which the lower left object 61 is later discarded), and the hole area for each of the holes 91 to 93 in FIG. 7.

The following parameters are now derived:

$N =$ Number of objects containing one or more holes (in image 90, $N = 3$)

$NOB =$ Number of objects with and without holes ($NOB = 4$ in image 60)

$SURF = \dfrac{\text{total-holes area}}{\text{total-objects total area}} =$ ratio of total surface area of holes to total surface area of objects including their holes.

$PERCENT = N/NOB =$ ratio of number of objects with holes to total number of objects with and without holes $RATIO = \dfrac{\text{hole area}}{\text{object total area}}$, for each object, the ratio of the area of its hole(s) to its area including its hole(s): RATIO is large for objects (tubules) with relatively large holes and small for objects with relatively small holes compared to object size.

$T =$ Number of objects containing significantly large holes, i.e. objects having RATIO > 0.09

The threshold used to determine $T$ discriminates against small holes unlikely to correspond to tubules.

At 42 the parameters obtained above are used to grade tubules detected in an image, and to derive a score with a value of 1, 2 or 3: the score is derived with reference to prearranged thresholds obtained by analysing a set of images which a pathologist has graded. The thresholding operation is performed using independent tests: the results of these tests are subsequently combined to yield a composite tubule score. Since the tests are all independent, any one on its own or combination of two or more can be used to provide a tubule score, but use of all five tests to provide a composite score produces better results.

Test1: PERCENT is compared to 12 and 20. A high PERCENT >20 has been observed to characterise score 1 images, while a low PERCENT <12 characterises score 3 images; otherwise, i.e. if 12≦PERCENT≦20, an image score of 2 is indicated.

Test2: T=Number of objects containing medium to large holes, i.e. for which RATIO>0.09, is compared to threshold values of 2 and 5: T<2, i.e. T=1 or 0, indicates an image score of 3, whereas T=5 or greater indicates score 1; otherwise, i.e. if T=2, 3 or 4, the score is more likely to be 2.

Test3: RATIO is large for objects (tubules) with relatively large holes and small for objects with relatively small holes compared to object size. RATIO is compared to threshold values of 0.07 and 0.03. When holes are large corresponding to image score 1, RATIO is likely to be higher than 0.07; when holes are small corresponding to image score 3, RATIO is likely to be below 0.03. Otherwise, i.e. if 0.03≦RATIO≦0.07, the indicated image score is 2.

Test4: N=Number of objects containing one or more holes (in image 90, N=3) corresponding to tubules. N is compared to 20 and 11: N>20 indicates a score 1 image and N<11 a score 3 image; otherwise i.e. if 11≦N≦20, the indicated image score is 2.

Test5: SURF: If SURF is greater than 0.001, the total area of holes is large indicating an image score of 1; if SURF is less than or equal to 0.0002, the total area of holes is small indicating an image score of 3; otherwise, i.e. if SURF is greater than 0.0002 but not greater than 0.001, an image score of 2 is indicated.

If PERCENT is greater than or equal to 600 the other tests are ignored and the image score is graded as 3. If PERCENT is less than 600, the final tubule score for an image is taken as the median value of five scores obtained respectively from the above five tests; When two images are used, two results for each test are obtained: the mean of these two results is computed and used with corresponding mean values from the other tests to derive a median value over the test results.

The invention was tested on a set of 206 images acquired at low magnification ×10: the results were 44 images at score 1, 24 images at score 2, 138 images at score 3 were gathered. The thresholds thereafter were set after a thorough observation of the image data obtained (grouping, clustering . . . ) and reaching a compromise. It is important to note that those thresholds may not be appropriate to another set of data because of staining differences. Furthermore those thresholds might be biased due to the fact that the image dataset contained a disproportionately large number of score 3 images.

The percentage and numbers of images graded by the classifier process of the invention in agreement with a pathologist's score was computed as well as the percentage and numbers of images where agreement was lacking. The results are tabulated below.

|  | Pathologist | | |
| --- | --- | --- | --- |
| Classifier | Score 1 | Score 2 | Score 3 |
| Score 1 | 70.4% | 4.2% | 5.1% |
| Score 2 | 18.2% | 70.8% | 21.7% |
| Score 3 | 11.4% | 25% | 73.2% |
| Score 1 | 31 | 1 | 7 |
| Score 2 | 8 | 17 | 30 |
| Score 3 | 5 | 6 | 101 |

Tubule gradings were calculated over 206 available images and compared with a pathologist's scores with the following results:

72.3% (149) images were graded by the classifier process of the invention with a score in agreement with a pathologist's score;

21.8% (45) images were graded by the classifier process of the invention with a score differing by 1 from a pathologist's score; and 5.8% (12) images were graded by the classifier process of the invention with a score differing by 2 from a pathologist's score.

The image dataset contained more than three times as many score 3 images (138) compared to score 1 images (44) and more than five times as many compared to score 2 images (24). Best results were obtained for images scored 3 by pathologists with an 73.2% correct classification: this might be attributable to the high number of images available enabling thresholds to be more optimised for score 3 images. A classification which is at least 70% correct was achieved for images of all three scores 1, 2 and 3. Since pathologists themselves are not necessarily more than 70% correct, this means that so far as it is possible to do so the invention is verified as regards all three scores. The average time to compute results for an image was estimated to be in the range 20 to 40 seconds.

The processing of digital image data in the tubules process of the invention can clearly be implemented by an appropriate computer program recorded on a carrier medium and running on a conventional computer system. Such a program is straightforward for a skilled programmer to implement without requiring invention, because a number of the processing functions are commercially available as indicated, and others are well known computational procedures. Such a program and computer system will therefore not be described further.

The invention claimed is:

1. A method of grading tubules, which may be any of round, oval, cylindrical or irregularly shaped, in a first image of a histological specimen, the method comprising using computer apparatus to carry out the steps of:
    a) providing a second image distinguishing first objects in the first image which are sufficiently large to indicate potential tubules and have pixel values at boundaries indicating epithelial layers, the first objects being processed so as to fill in any holes therein, by setting pixel values within the hole to its boundary value,
    b) providing a third image distinguishing second objects in the first image which have pixel values not indicating epithelial layers but instead fat and holes within said potential tubules,
    c) combining data from the second and third images to identify as holes within tubules those second objects which are contained within first objects by excluding objects not indicated to have epithelial layers and first objects not containing second objects, said second objects being contained second objects,
    d) performing one or more of the following:
        i) counting as tubules those of the first objects which have contained second objects within them to provide a number of tubules parameter,
        ii) counting the first objects to provide a number of objects parameter and determining a parameter expressing the number of tubules parameter as a proportion of the number of objects parameter,
        iii) determining the relative areas of the contained second objects as proportions of respective first objects within which they are located to provide respective ratio parameters,
        iv) determining the total area of contained second objects as a proportion of total area of first objects within which they are located to provide a surface area ratio parameter, and
        v) counting the number of first objects containing second objects having a ratio parameter as calculated in step iii) of at least 0.03, to provide a tubules parameter,
    e) grading the first image's tubules on the basis of the one or more parameters as aforesaid with reference to parameter threshold values, and
    f) using the grading of the first image's tubules to provide a tubule score for use in diagnosis.

2. A method according to claim 1 wherein the step of providing a second image incorporates:
    a) thresholding the first image to provide a thresholded image retaining relatively darker image pixels and rejecting relatively lighter image pixels,
    b) inverting the thresholded image to provide inverted image data,
    c) morphologically dilating the inverted image data to provide dilated image data,
    d) median filtering the dilated image data to provide filtered image data,
    e) hole filling the filtered image data to provide filled image data, and
    f) morphologically opening the filled image data.

3. A method according to claim 1 wherein the step of providing a third image comprises thresholding the first image to provide a binary fourth image in which relatively lighter image pixels have a different binary value to that of relatively darker image pixels.

4. A method according to claim 1 wherein the step of combining data from the second and third images comprises:
    a) either multiplying each pixel in the second image by a respective corresponding pixel located in a like position in the third image, or
    b) implementing a logical AND operation between each pixel in the second image and a respective pixel located in a like position in the third image.

5. A method according to claim 1 wherein the step of grading the first image's tubules employs parameter threshold values set to obtain a grading comparable with that obtainable by an appropriate medical expert.

6. Apparatus for grading tubules, which may be any of round, oval, cylindrical or irregularly shaped, in a first image of a histological specimen, the apparatus incorporating a microscope and a camera for photographing a histopathological specimen to obtain digitised colour image data, and computer means for receiving the digitised colour image data, the computer means being programmed to:
    a) compute a second image distinguishing first objects in the first image which are sufficiently large to indicate potential tubules and have pixel values at boundaries indicating epithelial layers, the first objects being processed so as to fill in any holes therein, by setting pixel values within the hold to its boundary value,
    b) compute a third image distinguishing second objects in the first image which have pixel values not indicating epithelial layers but instead fat and holes within said potential tubules,
    c) combine data from the second and third images to identify as holes within tubules those second objects which are contained within first objects by excluding objects not indicated to have epithelial layers and first objects not containing second objects, said second objects being contained second objects,
    d) implement one or more of the following:
        i) counting as tubules those of the first objects which have contained second objects within them to provide a number of tubules parameter,
        ii) counting the first objects to provide a number of objects parameter and determining a parameter expressing the number of tubules parameter as a proportion of the number of objects parameter,
        iii) determining the relative areas of contained second objects as proportions of respective first objects within which they are located to provide respective ratio parameters,
        iv) determining the total area of contained second objects as a proportion of total area of first objects within which they are located to provide a surface area ratio parameter, and
        v) counting the number of first objects containing second objects having a ratio parameter as calculated in step iii) of at least 0.03 to provide a tubules parameter, e) grade the first image's tubules on the basis of the one or more parameters as aforesaid with reference to parameter threshold values, and f) use the grading of the first image's tubules to provide a tubule score for use in diagnosis.

7. Apparatus according to claim 6 wherein the computer means is programmed to provide a second image by:
   a) thresholding the first image to provide a thresholded image retaining relatively darker image pixels and rejecting relatively lighter image pixels,
   b) inverting the thresholded image to provide inverted image data,
   c) morphologically dilating the inverted image data to provide dilated image data,
   d) median filtering the dilated image data to provide filtered image data,
   e) hole filling the filtered image data to provide filled image data, and
   f) morphologically opening the filled image data.

8. Apparatus according to claim 6 wherein the computer means is programmed to provide a third image by thresholding the first image to provide a binary fourth image in which relatively lighter image pixels have a different binary value to that of relatively darker image pixels.

9. Apparatus according to claim 6 wherein the computer means is programmed to combine data from the second and third images:
   a) either by multiplying each pixel in the second image by a respective corresponding pixel located in a like position in the third image, or
   b) by implementing a logical AND operation between each pixel in the second image and a respective pixel located in a like position in the third image.

10. Apparatus according to claim 6 wherein the computer means is programmed to grade the first image's tubules with parameter threshold values set to obtain a grading comparable with that obtainable by an appropriate medical expert.

11. A non-transitory carrier medium including a computer program recorded thereon, the computer program including instructions for use in grading tubules, which may be any of round, oval, cylindrical or irregularly shaped, in a first image of a histological specimen, the computer readable instructions being for controlling a computer apparatus to:
   a) compute a second image distinguishing first objects in the first image which are sufficiently large to indicate potential tubules and have pixel values at boundaries indicating epithelial layers, the first objects being processed so as to fill in any holes therein, by setting pixel values within the hold to its boundary value,
   b) compute a third image distinguishing second objects in the first image which have pixel values not indicating epithelial layers but instead fat and holes within tubules,
   c) combine data from the second and third images to identify as holes within said potential tubules those second objects which are contained within first objects by excluding objects not indicated to have epithelial layers and first objects not containing second objects, said second objects being contained second objects,
   d) implement one or more of the following:
      i) counting as tubules those of the first objects which have contained second objects within them to provide a number of tubules parameter,
      ii) counting the first objects to provide a number of objects parameter and determining a parameter expressing the number of tubules parameter as a proportion of the number of objects parameter,
      iii) determining the relative areas of contained second objects as proportions of respective first objects within which they are located to provide respective ratio parameters,
      iv) determining the total area of contained second objects as a proportion of total area of first objects within which they are located to provide a surface area ratio parameter, and
      v) counting the number of first objects containing second objects having a ratio parameter as calculated in step iii) of at least 0.03 to provide a tubules parameter,
   e) grade the first image's tubules on the basis of the one or more parameters as aforesaid with reference to parameter threshold values, and
   f) use the grading of the first image's tubules to provide a tubule score for use in diagnosis.

12. The computer software product according to claim 11 wherein the computer program includes further instructions for controlling the computer apparatus to compute a second image by:
   a) thresholding the first image to provide a thresholded image retaining relatively darker image pixels and rejecting relatively lighter image pixels,
   b) inverting the thresholded image to provide inverted image data,
   c) morphologically dilating the inverted image data to provide dilated image data,
   d) median filtering the dilated image data to provide filtered image data,
   e) hole filling the filtered image data to provide filled image data, and
   f) morphologically opening the filled image data.

13. The computer software product according to claim 11 wherein the computer program includes further instructions for controlling the computer apparatus to compute a third image by thresholding the first image to provide a binary fourth image in which relatively lighter image pixels have a different binary value to that of relatively darker image pixels.

14. The computer software product according to claim 11 wherein the computer program includes further instructions for controlling the computer apparatus to combine data from the second and third images:
   a) either by multiplying each pixel in the second image by a respective corresponding pixel located in a like position in the third image, or
   b) by implementing a logical AND operation between each pixel in the second image and a respective pixel located in a like position in the third image.

15. The computer software product according to claim 11 wherein the computer program includes further instructions for controlling the computer apparatus to grade the first image's tubules with parameter threshold values set to obtain a grading comparable with that obtainable by an appropriate medical expert.

* * * * *